Dec. 24, 1957  J. C. BARTLETT  2,817,181
FISH LURES
Filed Aug. 8, 1955
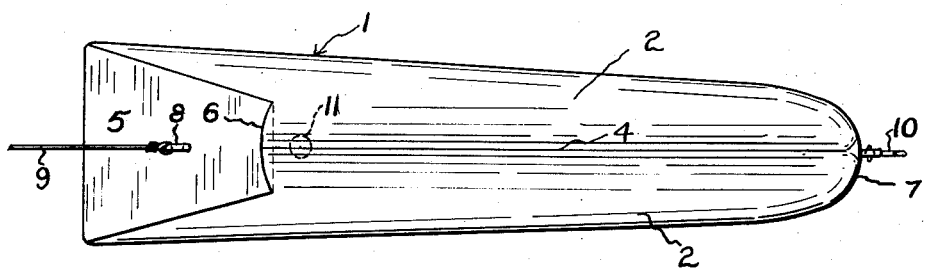
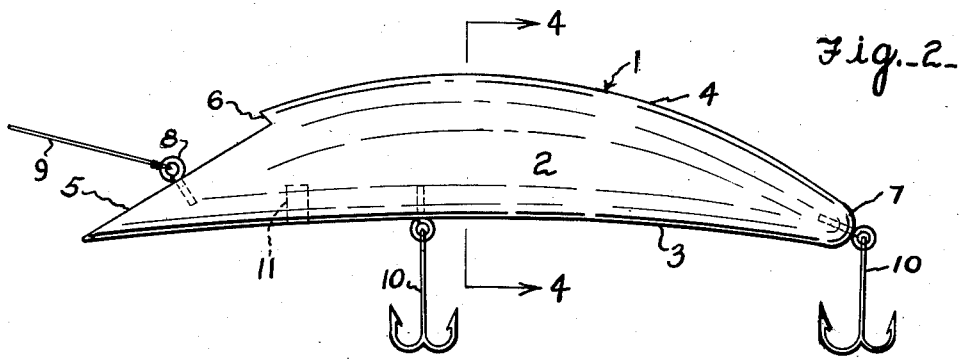
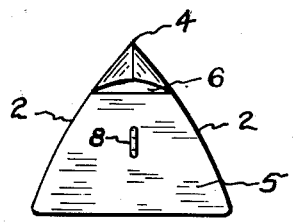
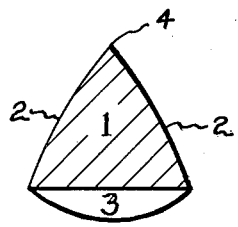
INVENTOR
JAMES C. BARTLETT
BY
ATTORNEY United States Patent Office 2,817,181
Patented Dec. 24, 1957

2,817,181
FISH LURES

James C. Bartlett, Detroit, Mich.

Application August 8, 1955, Serial No. 526,865

1 Claim. (Cl. 43—42.45)

This invention relates to fish lures and particularly lures of a type having a front face so inclined as to be subjected to downward pressure as the lure advances through water, thus tending to submerge the lure in proportion to its speed of advance.

An object of the invention is to so shape a lure of the described type as to lower its center of gravity and thus establish an intended floating position of the lure.

Another object is to impose on a lure a zigzag lateral play in addition to its diving response to advance through water.

Another object is to provide an elongated lure having a wide bottom face coextensive with the lure body and having opposed lateral faces upwardly converging from the bottom face and intersecting in the medial vertical plane of said body.

These and various other objects are attained by the construction hereinafter described and illustrated in the accompanying drawing, wherein:

Fig. 1 is a top plan view of my improved lure.
Fig. 2 is a side elevational view thereof.
Fig. 3 is a front view of the same.
Fig. 4 is a vertical cross-section taken on the line 4—4 of Fig. 2.

In these views, the reference character 1 designates an elongated buoyant body formed of wood or other similarly light material. In cross-section such body has the approximate form of an isosceles triangle, thus having similar lateral faces 2 extending convergently upward from its bottom face 3 and meeting in an edge 4 lying in the medial vertical longitudinal plane of the lure. The body has a front face 5 intersecting the face 3 at an angle approximating thirty degrees, in extending upwardly and rearwardly toward the edge 4. Adjoining the edge 4, the front face encounters a lip 6 extending forwardly so as to slightly overhang such face. The described body is gradually reduced in its cross-sectional area in extending rearwardly and has a rounded rear end 7. The bottom face of the body is without curvature between its lateral margins, but is bowed slightly upward between its ends. The edge 4 is bowed upwardly to a somewhat lesser radius than that of the bottom face. Between their upper and lower edges, the lateral faces 2 are preferably bowed slightly from each other, as best appears in Fig. 3, for the purpose of lowering the center of gravity of the lure. Set centrally into the face 5 is an eyelet 8 or the like for attaching a fish line 9 to the lure, and by a similar provision, a hook 10 is pivotally attached to the rear end of the body, and another to the mid-portion of its bottom face.

In producing the described lure in its larger sizes, it is preferred to extend a cavity upwardly into the body from the forward portion of the bottom face and to secure a metal weight 11 in such cavity, centering such weight in the medial vertical longitudinal plane of the body.

The described construction is advantageous primarily in imposing a peculiar zigzag travel on the lure as it is drawn behind a boat or retrieved after casting. The diving component of the lure action results from water pressure against the front face 5, such pressure varying as the speed at which the lure is drawn through water. Upon submerging a distance depending largely on the length of line 9, the pull exerted by the latter overcomes the pressure inducing diving and the lure then advances at a substantially constant depth if the direction of the pull remains constant, or gradually rises if the line is being retrieved. The zigzag component of travel is due to a reduced lateral stability in the submerged lure causing it to tilt laterally on its longitudinal axis. Such tilting sets up a lateral component of the thrust acting on the face 5, since the relatively wide lower portion of such face presents to such thrust a greater area than the upper portion, and hence the lure swerves laterally until resultant angularity of the line overcomes and reverses the lateral component. It will be noted in this connection that lateral stability of the lure is materially reduced when its front end is downwardly tilted to induce diving.

The particular shape of the lure and consequent lowering of its center of gravity is important in preventing any spinning of the lure about its central longitudinal axis, any such spinning having been found to be repellant as regards most fish. The absence of any transverse curvature of the bottom face 3 is also of importance in avoiding spinning.

What I claim is:

A fish lure comprising an elongated body substantially triangular in cross-section and having opposed and substantially duplicate lateral faces, a bottom face, a rounded rear face, and a front face, said lateral faces being upwardly convergent and also rearwardly convergent, and intersecting substantially in the medial longitudinal vertical plane of the body and being similarly convexly curved as they extend upwardly from the bottom face, and said front face being transverse to said medial plane and acutely divergent to the bottom face, the intersection of said lateral faces forming a convexly curved edge at the top of said body and the bottom face having a concave curvature substantially from end to end thereof, attachment means for a line at the front end of the body, and a hook attached to and depending from the body, said front face intersecting the bottom face substantially in a line transverse to said medial plane, and the width of said body being gradually decreased from said transverse line to said rear face.

References Cited in the file of this patent
UNITED STATES PATENTS

| | | |
|---|---|---|
| D. 147,102 | Adams et al. | July 15, 1947 |
| 1,455,624 | Koch | May 15, 1923 |
| 1,894,500 | Sweeney | Jan. 17, 1933 |
| 2,528,861 | Clasen et al. | Nov. 7, 1950 |
| 2,766,546 | Dodge | Oct. 16, 1956 |

FOREIGN PATENTS

| | | |
|---|---|---|
| 476,807 | Canada | Sept. 11, 1951 |